United States Patent [19]

Watanabe et al.

[11] Patent Number: 5,095,524
[45] Date of Patent: Mar. 10, 1992

[54] ON-LINE SYSTEM WHICH MAINLY EXECUTES REGULAR JOBS INCLUDING APPARATUS FOR EFFICIENTLY EXECUTING BOTH REGULAR JOBS AND IRREGULAR JOBS

[75] Inventors: Masayuki Watanabe; Keiichi Sakata, both of Yokohama; Yoshio Takayama, Kawasaki; Katsuya Kouda; Masakatsu Abe, both of Yokohama, all of Japan

[73] Assignee: Hitachi, Ltd., Tokyo, Japan

[21] Appl. No.: 713,599

[22] Filed: Jun. 11, 1991

Related U.S. Application Data

[63] Continuation of Ser. No. 276,030, Nov. 25, 1988, abandoned.

[30] Foreign Application Priority Data

Nov. 26, 1987 [JP] Japan ................... 62-298793
Nov. 26, 1987 [JP] Japan ................... 62-298794

[51] Int. Cl.$^5$ ................... G06F 15/16; G06F 13/00
[52] U.S. Cl. ................... 395/650; 364/DIG. 1;
364/228.4; 364/230; 364/231.4; 364/230.3;
364/245.5; 364/245.9; 364/245.2; 364/245
[58] Field of Search ... 364/200 MS File, 900 MS File

[56] References Cited

U.S. PATENT DOCUMENTS

| | | | |
|---|---|---|---|
| 3,771,134 | 11/1973 | Huether et al. | 364/200 |
| 3,771,135 | 11/1973 | Huether et al. | 364/200 |
| 4,319,336 | 3/1982 | Anderson et al. | 364/900 |
| 4,368,512 | 1/1983 | Kyu et al. | 364/200 |
| 4,460,960 | 7/1984 | Anderson et al. | 364/200 |
| 4,516,200 | 5/1985 | Thompson | 364/200 |
| 4,636,947 | 1/1987 | Word | 364/200 |
| 4,791,566 | 12/1988 | Sudama et al. | 364/200 |
| 4,937,784 | 6/1990 | Masai et al. | 364/200 |

*Primary Examiner*—Kevin A. Kriess
*Attorney, Agent, or Firm*—Antonelli, Terry Stout & Kraus

[57] ABSTRACT

An on-line system having a plurality of terminal equipments and host computers connectable to the terminal equipments, each host computer responsive to a job request from a terminal equipment being provided with an on-line process for transferring the control of the job request to a job execution process determined in accordance with the content of the job request, and a plurality of regular job execution processes for executing, if the job request is a regular job request, a regular job for the regular job request. The on-line control process is provided with an irregular job execution process space generating process for generating an irregular job execution process space for the irregular job execution. The irregular job execution process space generating process generates an irregular job execution process space upon the irregular job request from the terminal equipment, and calls an irregular job execution process request program for the irregular job request in the irregular job execution process space to execute an irregular job for the irregular job request.

2 Claims, 5 Drawing Sheets

ON-LINE SYSTEM WHICH MAINLY EXECUTES REGULAR JOBS INCLUDING APPARATUS FOR EFFICIENTLY EXECUTING BOTH REGULAR JOBS AND IRREGULAR JOBS

This application is a continuation of application Ser. No. 276,030, filed Nov. 25, 1988, now abandoned.

BACKGROUND OF THE INVENTION

The present invention relates to an on-line system, and more particularly to an on-line system having a plurality of terminal equipments and host computers connected to the terminal equipments and mainly executing regular jobs, wherein the system can efficiently execute irregular jobs as well as regular jobs requested by a terminal equipment.

A conventional on-line system has a plurality of host computers and terminal equipments connected to the host computers which execute jobs requested by the terminal computers. In such an on-line system, a job (process) request from a terminal computer includes a regular job request and an irregular job request. A transaction processing system has been adopted for executing a regular job. In a transaction processing system, a host computer processes a regular job in units of transaction data sent from a terminal equipment, in a fixed manner within a space (virtual address space) with predefined emvironments. The transaction processing system which processes a regular job in units of transaction and in a fixed manner is suitable for a regular job such as automatic cash accounting in a banking system, but it is not suitable for an irregular job.

An interactive processing system such as a Time Sharing System (TSS) has been adopted in an on-line system for executing an irregular job. In an interactive processing system, upon an irregular job request from a terminal equipment by a user, a new space (virtual address space) is generated to analyze the job request by using the space, to thereby select suitable programs and files, and perform other necessary processes. After predefining such necessary environments, the selected programs are made to run for execution of the given irregular job.

Such a time sharing system is suitable for an irregular job because after the necessary environments are predefined and suitable programs are selected to provide a job execution process, the given job is executed. However, each time an irregular job request is made by a user, a new virtual address space must be generated to prepare necessary environments and select necessary programs to predefine a job execution process. Thus, the overhead of processing becomes large and a large load is applied to a host computer.

It is therefore preferable to adopt the transaction processing system for execution of a regular job such as automatic cash accounting in a banking system, and the time sharing system for an irregular job, in order to reduce a load on a host computer.

A conventional terminal equipment has not been provided with an intelligence function so that it displays information sent from a host computer as it is, and sends information to the host computer in a format as requested by the host computer. The functions of a terminal equipment have been determined in accordance with the types of regular or irregular jobs the host computers execute. Thus, each terminal equipment has its specific function which is determined based on the type of jobs it requests to the host computer, and it has not been considered that a single terminal equipment is used for both regular and irregular jobs. For example, in "Guide to Information Processing System", at pp. 65 to 70, sixth Edition published on Apr. 10, 1980 by The Institute of Electrical Engineers of Japan, there are shown various types of on-line real time systems including an information retrieval system such as an on-line banking system and a shared use system such as a time sharing system. However, these systems are used independently and separately and the above document does not teach that the same terminal equipment is used for both systems.

With the advent of a terminal equipment having an intelligence function, however, it has become possible, for example, for a terminal equipment to process information from a host computer to some degree and display it, send information inputted by a user to the host computer by changing the information in a format suitable for the host computer. Thus, the same terminal equipment can be used for both regular and irregular jobs.

In the transaction processing system for executing a regular job, there is no specific interconnection between a terminal equipment and a job execution process (or virtual address space) within a host computer. Therefore, a single job execution process is commonly used by a number of terminal equipments, resulting in alleviating a load on a host computer and in facilitating user operation associated with job request.

In contrast with the above, in the interactive processing system such as a time sharing system, upon a job request from a terminal equipment, a virtual address space is generated in a host computer to prepare a job execution process therein.

Accordingly, if the same terminal equipment is used for an irregular job in a system which mainly executes regular jobs, the following problems occur. Namely, each time a job request is made by a user, a virtual address space must be generated and other necessary processes must be performed, resulting in a large load on a host computer and a cumbersome user operation associated with an irregular job request.

SUMMARY OF THE INVENTION

It is an object of the present invention to provide an on-line system mainly executing a regular job, wherein the system can execute an irregular job as well, in a similar manner to the case where a user operates upon a terminal equipment when a regular job request is made.

According to the on-line system of this invention, a space (process) for generating an irregular job process space is provided within an on-line control process of a host computer to thereby generate an irregular job process space when a user job request is judged as an irregular job request. Therefore, a user can operate upon a terminal equipment to execute an irregular job, as easy as when it is operated upon a regular job request.

According further to the on-line system of the present invention, a host computer is provided with irregular job process spaces and a table for supervising the status of the irregular job spaces. Upon an irregular job request from a user, a vacant irregular job process space is selected using the status supervision table and used for executing the irregular job. Therefore, the process to generate an irregular job process space each time a host computer executes an irregular job can be dispensed with, thereby alleviating a load on the host computer.

In particular, according to one aspect of the present invention, the on-line system having a plurality of terminal equipments and host computers connected to the terminal equipments comprises a plurality of job execution processes for executing a regular job, an on-line control process responsive to a job request from a terminal equipment for assigning the job request to a particular job execution process in accordance with the content of the job request, and an irregular job process space generating means provided within the on-line control process for generating an irregular job process space within which the irregular job is executed, wherein upon an irregular job request from a terminal equipment, an irregular job process space is generated by irregular job space generating means to thereby call therein an irregular job execution process request program and run the program to execute the irregular job.

Upon a regular job request from a terminal equipment, a regular job execution process request program is called in a predetermined regular job process space to execute the regular job. Upon an irregular job process request from a terminal equipment, an irregular job process space is generated by irregular job space generating means to thereby call therein an irregular job execution process request program and run the program to execute the irregular job. Therefore, a user can operate upon a terminal equipment to execute an irregular job, as easy as when it is operated for a regular job request.

As above, upon a job request from a terminal equipment by a user, the job request is passed from a terminal on-line control process in a terminal equipment to the host on-line control process in a host computer. Then, the host on-line control process analyzes the job request from the terminal equipment. If the job request is directed to regular job execution processes prepared beforehand, a particular regular job execution process is executed for the regular job request. Alternatively, if the job request is directed to irregular job execution processes not prepared beforehand, irregular job process space generating means generates an irregular job process space to call therein an associated irregular job execution process request program and run the program to execute the irregular job. The processed result by the irregular job execution process request program is sent back to the terminal equipment from which the job request was issued via the on-line control process. Upon completion of processing the job request, the on-line control process makes the generated irregular job process space disappear.

Therefore, a user can operate upon a terminal equipment to execute even an irregular job whatever the type thereof may be, as easy as when it is operated for a regular job request.

According to another aspect of the present invention, the on-line processing system for mainly executing a regular job comprises irregular job process space control means provided in an on-line control process for generating beforehand a predetermined number of irregular job process spaces within which an irregular job is executed, and supervising the status of the irregular job process spaces, wherein upon an irregular job request from a terminal equipment, a particular irregular job process space is assigned to the irregular job by irregular job process space control means to call therein an irregular job execution process request program to execute the irregular job. At the start of the on-line system, the on-line control process prepares beforehand a plurality of job execution processes for execution of a regular job, generates a predetermined number of irregular job process spaces in accordance with irregular job process space control means in the on-line control process, and forms a table for supervising the status of the generated irregular job process spaces.

Upon a job request from a terminal equipment, the on-line control process activates a particular regular job execution process prepared beforehand if the job request is directed to regular job execution processes prepared beforehand. If the job request is not directed to regular job execution processes prepared beforehand, it is judged that the job request is an irregular job request. Then, the status of the generated irregular process spaces is checked, and if there is an unoccupied or unused irregular job process space, it is made enable so that an irregular job execution process request program is called therein to execute an irregular job. If there is no unoccupied irregular job process space, the irregular job request from the terminal equipment is rejected.

Upon completion of processing the irregular job request, the used irregular job process space is made unoccupied and then subjected to the control by irregular job process space control means.

As above, the on-line system allows irregular job process space control means to concurrently execute the irregular job requests as many as the predetermined number of irregular job process spaces prepared beforehand. In addition, it is not necessary to generate an irregular job process space each time an irregular job request is made, so that a load on a host computer is alleviated in generating such a space.

According to the present invention, irregular job process space generating means is provided in the on-line control process to generate an irregular job process space for an irregular job request so that, upon irregular job requests, a particular irregular job process space is generated sequentially for each request. Therefore, in the on-line system for mainly executing a regular job, an irregular job request from a terminal equipment can be processed easily in a similar manner to the case where a regular job request is processed.

According further to the present invention, irregular job process space control means is provided in the on-line control process, and a predetermined number of irregular job process spaces are generated beforehand so that it is not necessary, for execution of an irregular job request from a terminal equipment, to generate an irregular job process space each time an irregular job request is made, resulting in alleviating a load on a host computer in generating such a space. In addition, a plurality of job requests can be executed concurrently in the on-line system.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Figure 1:
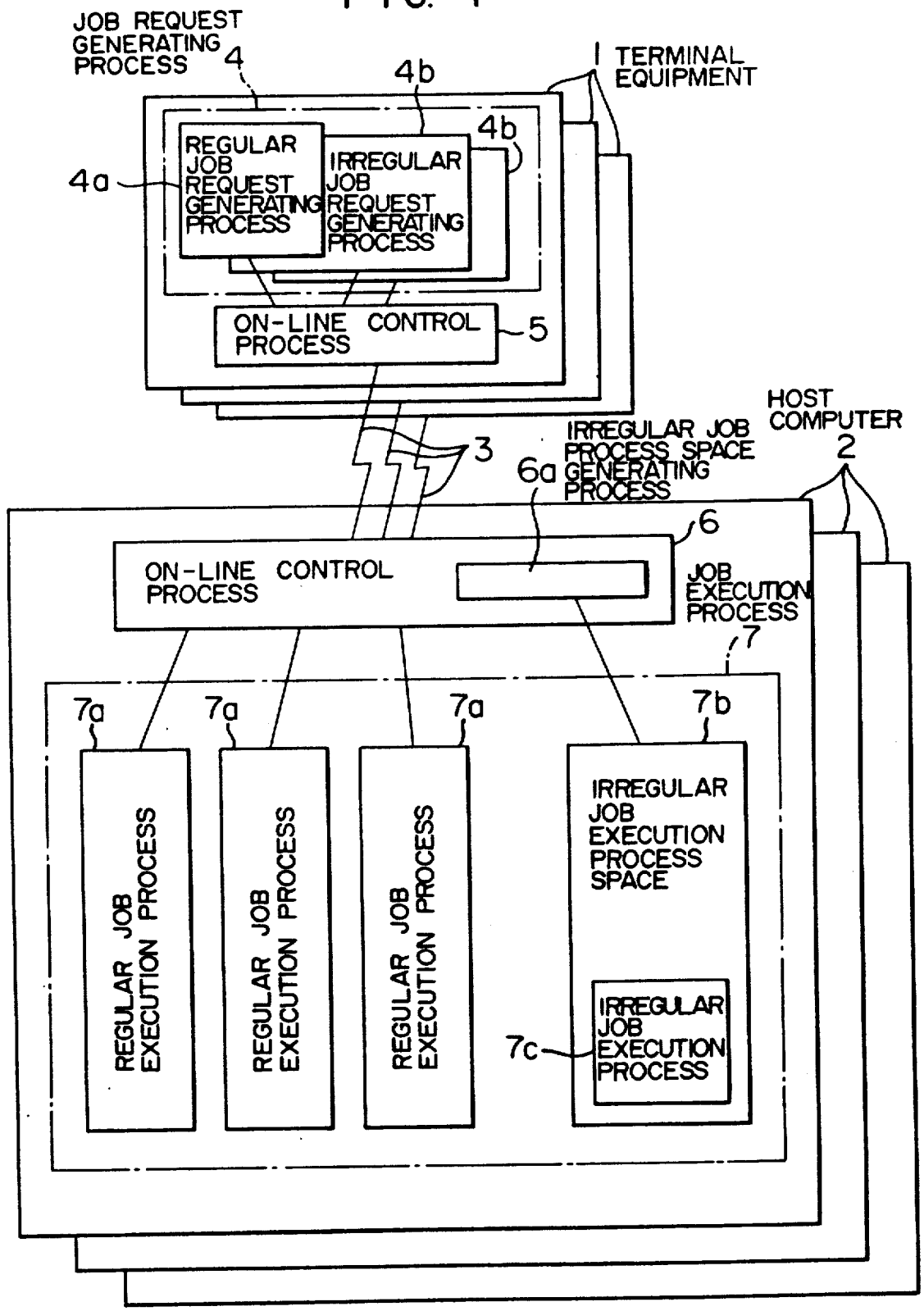
FIG. 1 is a block diagram showing the overall arrangement of an embodiment of the on-line system according to the present invention.

The embodiments of the present invention will be described with reference to the accompanying drawings.

In the drawings illustrating the embodiments, element having identical functions are given same reference numerals, and the description of same elements are not repeated.

FIG. 1 is a block diagram showing the overall structure of an embodiment of the on-line system according to the present invention. In this embodiment, upon an irregular job request from a terminal equipment, an irregular job space is generated. Referring to FIG. 1, a plurality of on-line terminal equipments 1 each operating as a high performance work station are coupled via communication lines 3 to a plurality of host computers 2, to thereby constitute an on-line system. Each on-line terminal equipment is provided with a request generating process 4 for generating a job request in response to a user job request, and a terminal on-line control process 5 for controlling a communication line 3. The request generating process 4 is constructed of a regular job request generating process 4a for generating a regular job request, and a plurality of irregular job request generating processes 4b for generating an irregular job request. Each host computer 2 is provided with a host on-line control process 6 for controlling the communication lines 3, and a job execution process 7 for executing a job requested from an on-line terminal equipment 1. The job execution process 7 is constructed of a plurality of regular job execution processes 7a for executing a regular job, and an irregular job space 7b used for dynamically activating an irregular job execution process 7c which executes an irregular job. Each regular job execution process 7a has the content matching a regular job request from each job request generating process 4a. A job request from the regular job request generating process 4a is processed by the corresponding regular job execution process 7a. A job request from the irregular job request generating process 4b is processed by the irregular job execution process 7c in the irregular job process space 7b generated by an irregular job space generating process 6a of the host on-line control process 6, the irregular job process 7c being activated dynamically, i.e., at the time of irregular job request, so as to match any one of various types of job requests.

Figure 2:
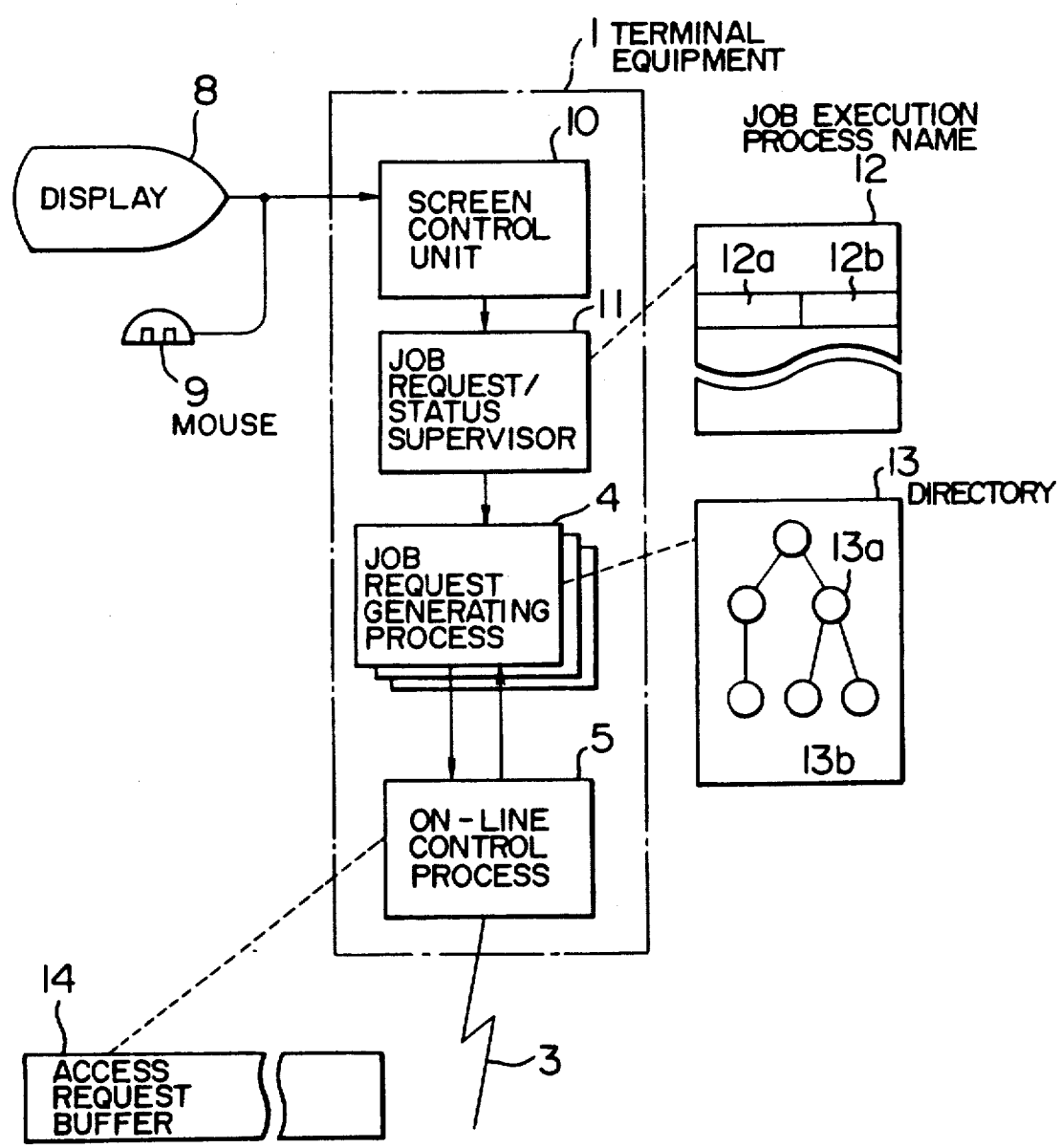
FIG. 2 is a block diagram used for explaining the operation of a terminal equipment of the on-line system.
Figure 3:
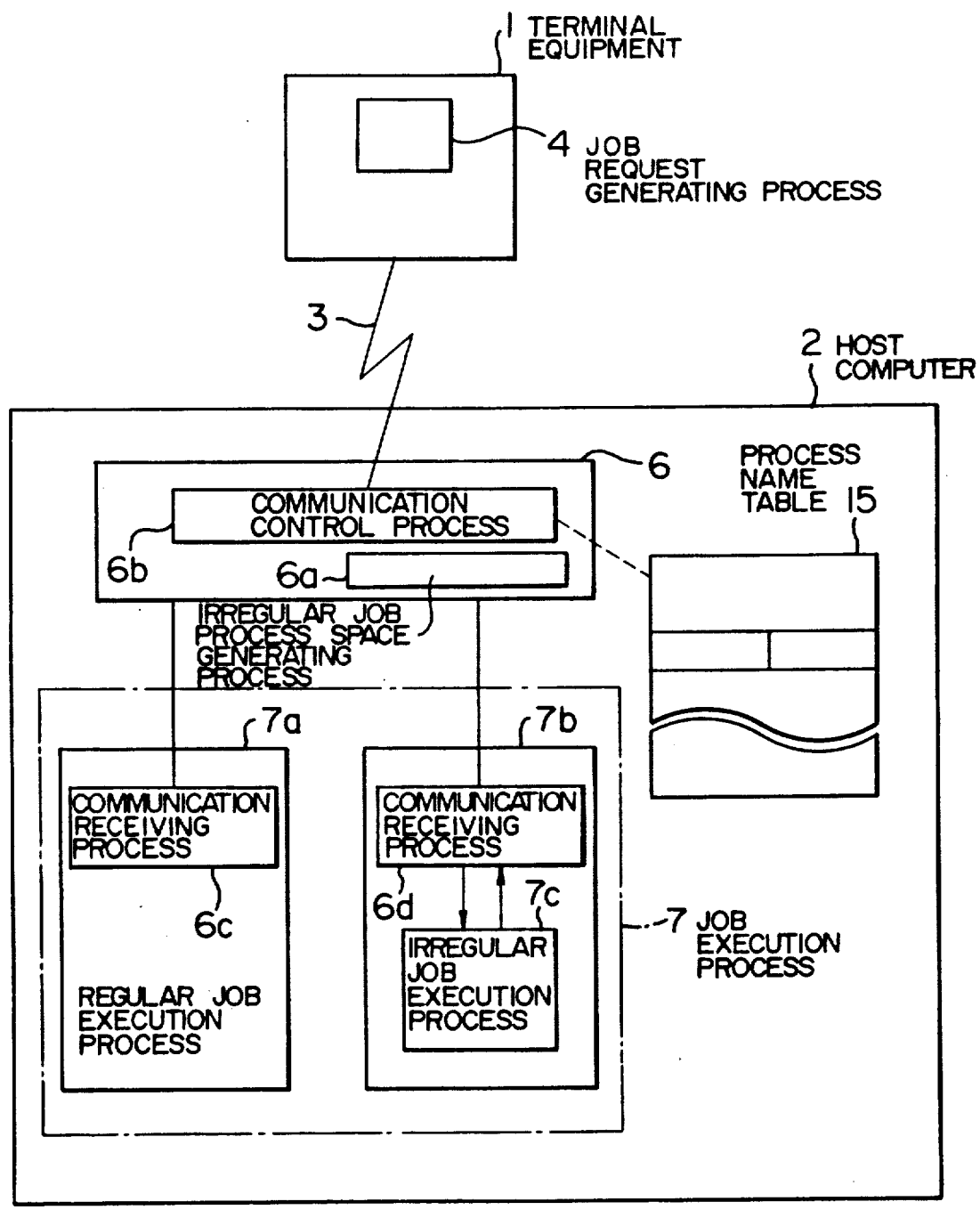
FIG. 3 is a block diagram used for explaining the operation of a host computer shown in FIG. 1.

FIG. 2 is a block diagram used for explaining the operation of the on-line terminal equipment shown in FIG. 1, and FIG. 3 is a block diagram used for explaining the operation of the host computer shown in FIG. 1.

The operation of the on-line system shown in FIG. 1 will be described with reference to FIGS. 2 and 3.

Referring to FIG. 2, as an input means for a user to input a job request, the on-line terminal equipment 1 is provided with a display 8 and a mouse 9 for indicating a desired position on the display. An end user selects, by using the mouse 9, one of symbols (devices) or icons displayed on the display 8 to thereby input a desired job request. An icon is a graphic symbol representing an objective process which is virtually assigned in a space of the host computer or terminal equipment. In particular, resources such as a file and program in the host computer or terminal equipment is given graphic symbols easy to be understood by a user. For example, a file which stores data in the form of table is given a graphic symbol indicative of a report sheet. A user inputs a desired job request from an on-line terminal equipment 1 by moving the mouse 9 to position an arrow cursor at one of the icons displayed on the display 8 so as to select a desired file or program to be used by the job request.

A screen control unit 10 of the on-line terminal equipment 1 causes the icons to be displayed on the display 8, and receives an icon selection signal from the mouse 9 when a user selected a desired icon by using the mouse 9. The icon selection signal is then sent to a job request/status supervisor 11. The job request/status supervisor 11 determines which host computer and which job execution process are to be used in executing the job request selected by using an icon, while searching an icon attribute table 12 previously stored in a memory of the on-line terminal equipment 1. The icon attribute table 12 stores icons 12a and job execution process names 12b in one-to-one correspondence with each other. By searching the icon attribute table 12, a particular job execution process name can be obtained. The job request/status supervisor 11 activates a particular regular job request generating process 4a to generate a regular job request if the searched process name is a name for a regular job process, whereas on the other hand it activates a particular irregular job request generating process 4b if the searched process name is a name for an irregular job process. If a job request is made which cannot be searched in the icon attribute table 12, an irregular job request generating process 4b is activated.

The activated job request generating process 4a or 4b determines the location of an objective process, by searching a directory 13 based on the file or program name of the job execution process obtained by using the icon attribute table 12. The directory 13 stores the locations of the job execution processes in the form of tree structure. A node 13b which corresponds to the searched job execution process and a node 13a above the node 13b indicate the locations (destination processor name and host computer name) of the process objects. If an objective process is present within the on-line terminal equipment 1, the requested job is executed by a job execution process (not shown) within the terminal equipment 1. Alternatively, if an objective process is present at the other processor (host computer), then finally fixed is the job execution process name for the job execution process for which a request is issued by the job request generating process 4a or 4b of the on-line terminal equipment 1. The job execution process name for the job request is stored in the memory of the on-line terminal equipment 1. After finally determining the host computer name and job execution process name, the job request generating process 4a or 4b outputs an access request to the terminal on-line control process 5 for access to the objective job execution process 7. The terminal on-line control process 5 interconnects the destination processor (host computer) and a communication line 3 in accordance with predetermined communication protocol information. After establishing interconnection, data in an access request buffer 14 are transferred to the destination host computer 2.

FIG. 3 is a block diagram used for explaining the operation of the host computer 2. Referring to FIG. 3, the host computer 2 is provided with a host on-line control process 6 by which an access request and job request from the on-line terminal equipment 1 are supplied to a regular job execution process 7a or irregular job execution process 7c. The data in the access request buffer 14 designated by the job request generating process 4 of the on-line terminal equipment 1 are transferred first to the host on-line control process 6 which is notified of the job execution process name based on the transferred data. If the job request is determined as directed to a regular job execution process prepared beforehand, then the transferred data are arranged to be sent to a particular regular job execution process 7a. A regular job execution process 7a is a process dedicated to a particular job request and occupies a particular virtual address space of the virtual memory. In view of this, a communication control process 6b provided in the on-line control process 6 searches a process name table 15 to obtain the corresponding regular job execution process 7a. Then, the communication control process 6b activates, using for example a space designation function (cross memory post), a communication acknowledge process 6c of the regular job execution process 7a now concerned to perform necessary communication process therebetween.

Alternatively, if the on-line control process 6 determines based on the transferred data in the access request buffer 14 that the job request is directed to an irregular job execution process not prepared beforehand, then in order to execute the irregular job request, an irregular job process space generating process 6a is activated to generate an irregular job process space 7b, and a communication acknowledge process 6d is activated to thus perform necessary communication process between the communication control process 6 and communication acknowledge process 6d, similar to the case of access to the regular job execution process 7a.

Upon sending back an acknowledgement after checking the job request by the communication acknowledge process 6c or 6d, the access between the job request generating process 4 of the on-line terminal equipment 1 and the job execution process 7 of the host computer is established. After this access establishment, the job request from the job request generating process 4 of the on-line terminal equipment 1 is acknowledged by the job execution process 7 of the host computer 2, similar to the case of access to a job execution process in a conventional transaction process. So long as the job requests issued by the on-line terminal equipment 1 and sent to the host computer 2 can be executed by the same job execution process 7, the access between the job request generating process 4 and job execution process 7 is maintained to be continued.

The regular job execution process 7a for a particular regular job request is a space with predefined environments after file designation and OPEN process. Although the regular job execution process 7a can execute only a particular regular job request, it can acknowledge a plurality of regular requests from a number of on-line terminal equipments 1. In addition, the regular job execution process 7a may be operated upon as in the following. For example, consider the case where a user job request from an on-line terminal equipment changes to thus become necessary to change to another regular job execution process. In such a case, upon selection of a necessary job request through designation of a corresponding icon by the mouse 9, the job request/status supervisor 11 of the on-line terminal equipment 1 activates the corresponding job request generating process, and in accordance with the above-described access process, an access to the newly selected, regular job execution process is carried out in the host computer 2. Such access can be carried out independently from the previous access which may be held and used again if necessary, or may be released from such holding state. Or in some cases, both the accesses may by used to allow two different types of job requests at a time.

The irregular job execution process space 7b is a space with predefined environments within which space an irregular job execution process 7c for a particular irregular job request can be executed. The on-line control process 6 calls in the irregular job execution process space 7b an irregular job execution request program to activate the irregular job execution process 7c, thus allowing to execute any type of user irregular requests from an on-line terminal equipment 1. For example, consider the case where a user job request from an on-line terminal equipment changes to thus become necessary to change to another irregular job xecution process. In such a case, upon selection of a necessary job request through designation of a corresponding icon by the mouse 9, the job request status supervisor 11 of the on-line terminal equipment 1 acknowledges the job request, and the job request is enabled to thus call a necessary irregular job execution request program. Then, the corresponding irregular job execution process 7c is activated to execute the irregular job. Upon completion of the necessary processes, if the irregular job execution process space 7b now concerned becomes unnecessary, it is released so that unnecessary virtual memory space is not occupied.

As described so far, according to the above embodiment, a user job request is analyzed by an on-line terminal equipment. If the job request is directed to a regular job execution process, it becomes unnecessary to predefine environments (such as file designation, OPEN process, table storage in a memory, and the like) for a particular regular job execution process which otherwise should have been predefined within host computers. Further, a number of regular jobs can be executed by a same regular job execution process at a time. Accordingly, the number of spaces on a virtual memory occupied by regular job execution processes can be reduced and hence the amount of resources of a host computer can be made less, resulting in alleviating a load on a host computer, and in increasing the number of on-line terminal equipments connectable to host computers by about ten times as that of a conventional time sharing system. Further, a regular job execution process for a regular job request is not necessary to be provided in a particular host computer, but data such as documents and tables in each host computer can be freely accessed from a number of terminal equipments by using the same procedure. Furthermore, since a regular job execution process 7a is activated if a user job request from an on-line terminal equipment 1 is directed to a regular job execution process, whereas if a user job request is directed to an irregular job execution process, then an irregular job process space is dynamically generated to activate an irregular job execution process 7c for a desired irregular job. Therefore, a job request from an on-line terminal equipment 1 can be processed easily in a similar manner, irrespective of whether it is a regular or irregular job request.

Next, a second embodiment of the on-line system of this invention will be described with reference to the accompanying drawings. In this embodiment, the on-line system is provided beforehand with irregular job process spaces for use with an irregular job request from a terminal equipment.

Figure 4:
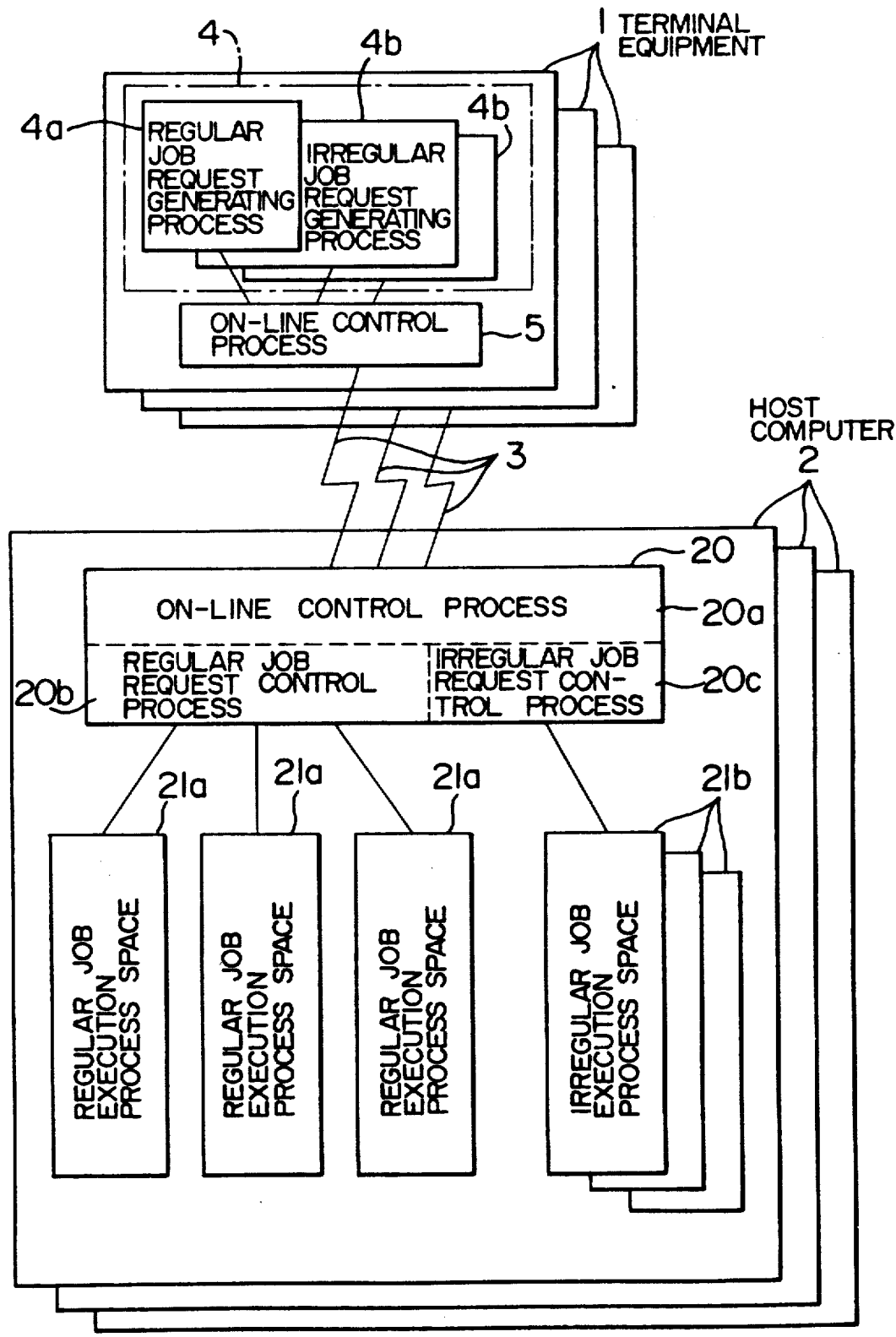
FIG. 4 is a block diagram showing the overall arrangement of another embodiment of the on-line system according to the present invention.

FIG. 4 shows the overall arrangement of the on-line system having a plurality of terminal equipments functioning as high performance work stations and a plurality of host computers connected to the terminal equipments. The structure of a terminal equipment 1 is the same as that shown in FIG. 1. Each terminal equipment 1 is provided with a regular job request generating process 4a, irregular job request generating processes 4b, and a terminal on-line control process 5 for controlling communication lines 3. Each host computer 3 is provided with a host on-line control process space 20, a plurality of regular job execution process spaces 21a for a regular job request, and a predetermined number of irregular job execution process spaces 21b for an irregular job request. The on-line control process space 20 is constructed of an on-line control process 20a for controlling communication with a terminal equipment 1, a regular job request control process 20b for sending a regular job request from a regular job request generating process 4a of a terminal equipment 1 to a particular regular job execution process space 21a, and an irregular job request control process 20c which generates beforehand irregular job execution process spaces 21b, supervises the status of irregular job execution process spaces 21b, and sends an irregular job request from the irregular job request generating process 4b of a terminal equipment 1 to a particular irregular job execution process space 21b. Each regular job execution process space 21a has its specific function to match the content of a regular job request from each regular job request generating process 4a of a terminal equipment 1. A regular job request from the regular job request generating process 4a is processed in the regular job execution process space 21a, whereas an irregular job request from the irregular job request generating process 4b is processed in the irregular job execution process space 21b which is supervised by the irregular job request control process 20c of the on-line control process 20.

Similar to the first embodiment as described with FIG. 2, an end user at a terminal equipment 1 inputs a job request by using a mouse. The terminal equipment 1 analyzes the inputted job request, and the job execution process name for the job request is obtained by searching an icon attribute table 12. A job request/status supervisor 11 activates a particular regular or irregular job request generating process 4a or 4b in accordance with the obtained name.

In case of a regular job request, the activated regular job request generating process 4a operates in a similar manner to the case as described with FIG. 2. The on-line control process 5 performs a connection to a destination processor (host computer) via the communication line 3 to then send the data in an access request buffer 14 to the destination host computer 2.

In case of an irregular job request, referring now to FIG. 2, the activated irregular job request generating process 4b identifies a host computer 2 for the irregular job in accordance with the host computer name among the names of objective processes obtained from the icon attribute table 12, and thereafter sends an access request to the terminal on-line control process 5. The terminal on-line control process 5 performs a connection to the access requested host computer 2 via the communication line 3. After the connection, the data in the access request buffer 14 are sent to the host computer 2. After completion of the connection between the terminal equipment 1 and the host computer 2, the irregular job request generating process 4b waits for a TSS command from an end user. Upon input of a TSS command by a user, the irregular job request generating process 4b transfers the TSS command associated with the irregular job request to the accessed host computer 2.

Figure 5:
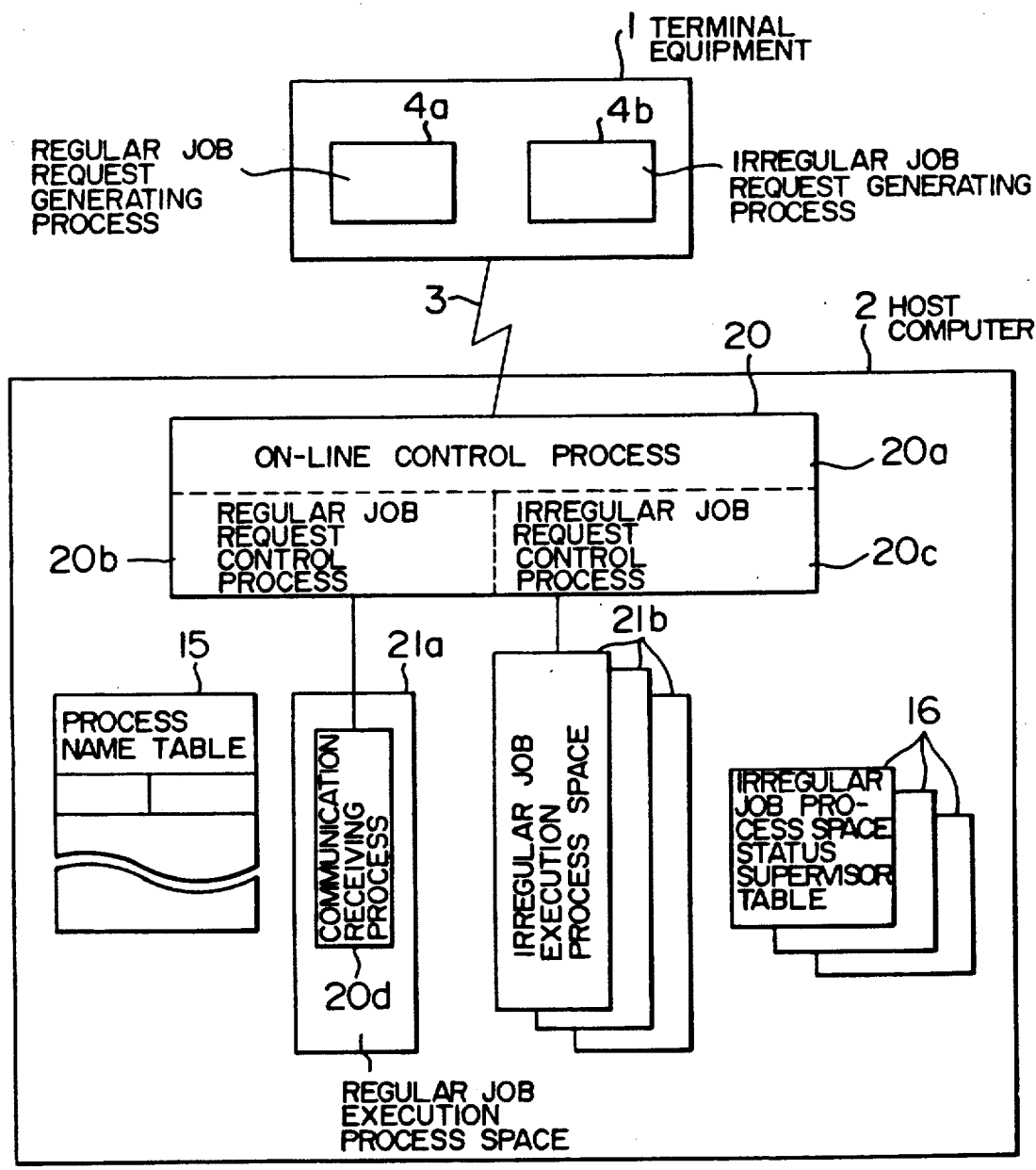
FIG. 5 is a block diagram used for explaining the operation of a host computer shown in FIG. 4.

FIG. 5 is a block diagram used for explaining the operation of the host computer of the second embodiment shown in FIG. 4. Referring to FIG. 5, the host computer 2 is provided with the host on-line control process 20 for receiving an access request and job request from the on-line terminal equipment 1, the plurality of regular job execution process spaces 21a for regular job requests from the terminal equipments 1, and the predetermined number of irregular job execution process spaces 21b for processing TSS commands from the terminal equipments 1. Each irregular job execution process space 21b of the host computer 2 is a space dedicated to a particular irregular job execution process for the irregular job request, and occupies a particular virtual address space of the virtual memory. The irregular job execution process spaces 21b together with an irregular job process space status supervisor table 16 are generated beforehand by the irregular job execution control process 20c of the on-line control process 20. The use status of irregular job execution process spaces 21b are supervised by the irregular job process space status supervisor table 16 under control of the irregular job execution control process 20c. Upon reception of an access request, the on-line control process 20 is notified of a regular job execution process name in accordance with the data in the access request buffer 14 sent from the terminal equipment 1, and then searches a process name table 15. If there is the regular job execution process name now concerned in the process name table 15, then the job request is confirmed that it is a regular job request, to thus activate the regular job request control process 20b. The regular job request control process 20b is notified of a particular regular job execution process space 21a by using the process name table 15, and activates a communication acknowledge process 20d in the regular job execution process space 21a by using a space designation function (cross memory post). The communication acknowledge process 20d checks the access request and sends back an acknowledgement so that the access between the regular job request generating process 4a of the terminal equipment 1 and the regular job execution process space 21a of the host computer 2 is established. After this access establishment, the job request from the job request generating process 4a of the terminal equipment 1 is acknowledged by the regular job execution process spaced 21a of the host computer 2, similar to the case of access to a job execution process in a conventional transaction process. So long as the job requests issued by the terminal equipment 1 and sent to the host computer 2 can be executed by the same regular job execution process space 21a, the access between the job request generating process 4a and the regular job execution process 21a is maintained to be continued. The regular job execution process space 21a for a particular regular job request is a space with predefined environments after file designation and OPEN process. Although the regular job execution process 21a can execute only a particular regular job request, it can acknowledge plurality of regular requests from a number of on-line terminal equipments 1.

If the regular job execution process name is not found in the process name table 15, then the job request is regarded as an irregular job request. Therefore, the status of irregular job execution process spaces 21b is checked by using the irregular job process space status supervisor table 16 under control of the irregular job request control process 20c. If there is a vacant irregular job execution process space 21b, the irregular job process space status supervisor table 16 corresponding to the vacant irregular job execution process space 21b is made in-use state. The irregular job execution process space 21b is then subjected to an initializing (LOGON) process. After this initialization, an acknowledgement of the job request is sent back, and an access is made. After completion of the access, the irregular job execution process space 21b is used for execution of the job request, in the manner similar to a conventional irregular job execution process. Upon request of a release of the access after executing the job request, a terminating (LOGOFF) process is carried out for the irregular job execution process space 21b, and the irregular job process space status supervisor table 16 corresponding to the irregular job execution process space 21b is made out-of-use state to thus prepare for the next job request. If there is no vacant job execution process space 21b, the job request for an irregular job execution is rejected.

Consider now that a user job request from a terminal equipment 1 changes to thus become such that functions of another irregular or regular job execution process space are necessary. In such a case, upon selection of a necessary job request through designation of a corresponding icon by then mouse 9, the job request/status supervisor 11 of the terminal equipment 1 activates the job execution process corresponding to that selected by the icon, to thereby obtain an access to a regular or irregular job execution process space respectively 21a or 21b of the host computer 2. Such access can be carried out independently from the previous access which may be held and used again if necessary, or may be released from such holding state. Or in some cases, both the accesses may be used to allow two different types of job requests at a time.

While particular embodiments of the invention have been shown and described, it will be obvious to those skilled in the art that various changes and modifications may be made without departing from the present invention in its broader aspects.

We claim:

1. An on-line system for executing jobs, wherein said system mainly executes a job being defined as a regular job which includes, a transaction process, said system comprising:
 a plurality of terminal equipments each including means for discriminating whether a request given by a user is for execution of a regular job mainly executed by said system or execution of a job other than said regular job, said job other than said regular job being defined as an irregular job which includes, an interactive process defined as a time sharing system, said means for discriminating generates a regular job request or an irregular job request based on said discrimination; and
 a plurality of host computers connectable to said plurality of terminal equipments, each host computer responsive to a job request from a terminal equipment being provided with an on-line control process for transferring the control of said job request to a job execution process determined in accordance with the content of said job request, and a plurality of regular job execution processes each executing, if said job request is a regular job request, a regular job for a regular job request whose control was transferred from said on-line control process;
 wherein said on-line control process is provided with irregular job execution process space generating means for generating an irregular job execution process space, said irregular job execution process space generating means generates an irregular job execution process space based upon said irregular job request from said terminal equipment, and calls an irregular job execution process request program for said irregular job request in said irregular job execution process space to execute an irregular job for said irregular job request.

2. An on-line system for executing jobs, wherein said system mainly executes a job being defined as a regular job which includes, a transaction process, said system comprising:
 a plurality of terminal equipments each including means for discriminating whether a request given by a user is for execution of a regular job mainly executed by said system or execution of a job other than said required job, said job other than said regular job being defined as an irregular job which includes, an interactive process defined as a time sharing system, said means for discriminating generates a regular job request or an irregular job request based on said discrimination; and
 a plurality of host computers connectable to said plurality of terminal equipments, each host computer responsive to a job request from a terminal equipment being provided with an on-line control process for transferring the control of said job request to a job execution process determined in accordance with the content of said job request, and a plurality of regular job execution processes each executing, if said job request is a regular job request, a regular job for a regular job request whose control was transferred from said on-line control process;
 wherein said on-line control process is provided with irregular job execution process space generating means for generating an irregular job execution process space;
 wherein a predetermined number of irregular job execution process spaces are provided beforehand in each of said host computers by said irregular job execution process space generating means, and each host computer is provided with irregular job execution process space controlling means for supervising the status of said irregular job execution process spaces; and
 wherein if said irregular job request is made from said terminal equipment, said irregular job execution process space controlling means assigns an irregular job execution process space to said irregular job request, and calls an irregular job execution process request program in said assigned irregular job execution process space to execute an irregular job for said irregular job request.

* * * * *